Patented Nov. 13, 1934

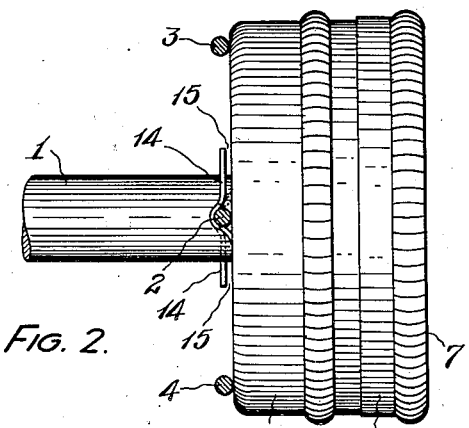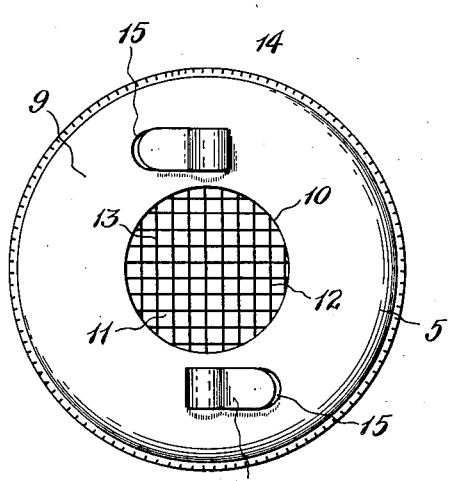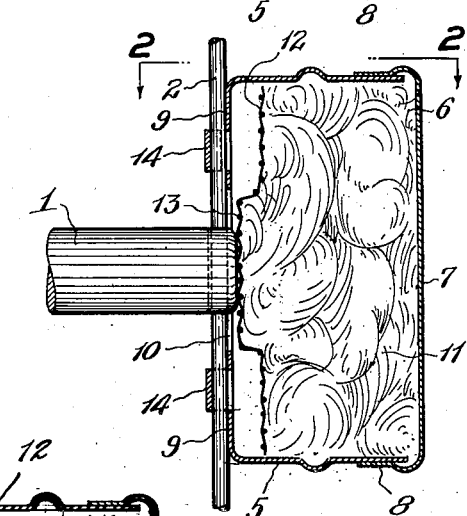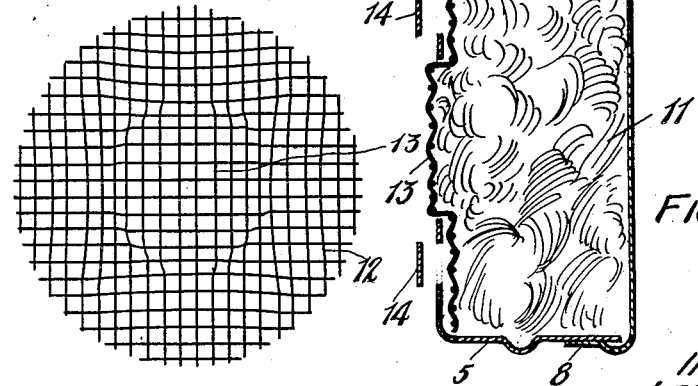

1,980,754

UNITED STATES PATENT OFFICE 1,980,754

INSECT TRAP

Leslie G. Henning and John Rein, Cleveland, Ohio, assignors to The H & R Sales Company, Cleveland, Ohio, a corporation of Ohio Application April 26, 1930, Serial No. 447,538
Renewed April 4, 1934

4 Claims. (Cl. 43—132)

Our invention particularly relates to insect traps which attract and catch bird-mites. The red mites are those for which our improved trap construction is particularly devised. As is well known, these red mites attack the birds only at night time, and leave the birds during day time. During this latter period these mites are concealed in cracks and crevices of the cage and associated elements and are attracted to anything white.

The annexed drawing and the following description set forth in detail certain means embodying our invention, such means constituting, however, but one of the forms in which the principle of the invention may be applied.

In said annexed drawing:

Figure 1 is a vertical axial section of our improved trap attached to one of the vertical wires constituting the bars of an ordinary bird-cage, this wire and one end of the perch being partially shown in side elevation, the scale of the drawing being about twice the size of the trap in both dimensions;

Figure 2 is a plan section of the devices shown in Figure 1, taken in the plane indicated by the line 2—2, Figure 1;

Figure 3 is a front elevation of the improved trap; and

Figure 4 is an elevation of a screen element forming part of the improved trap.

Figure 5 is a cross section showing the trap in its normal position before attachment to a wire of a bird-cage.

Referring to the annexed drawing, in which the same parts are indicated by the same respective ordinals in the different views, an end of an ordinary perch 1 of a bird-cage is shown as being intersected by one of the vertical wires 2 of which the bars of the cage are comprised, the perch 1 being notched to receive this wire 2 as is well known to those skilled in the art. Two adjacent vertical cage wires are indicated by the ordinals 3 and 4, Figure 2. Our improved insect trap is designed to be centralized in contact with the end of the perch 1, by means hereinafter fully described, and securely attached to the wire 2 of the cage.

The insect trap proper comprises a drum 5 of cylindrical formation, having an open rear end 6 which is covered by a removable lid 7 having a lateral spring flange 8 by means of which the lid can be removably but firmly secured to the body member 5. The body 5 is formed with an annular flange 9 upon its front face which surrounds a hole 10 forming an entrance to the trap. The end of the perch 1 extends into or adjacent this hole 10 and in contact with a screen, hereinafter fully described, which extends from within the drum 5 slightly outwardly through the hole 10, when the trap is not mounted. Within the chamber of the trap is provided an attracting and entangling element 11, this element preferably being comprised of a good grade of white absorbent cotton. Material of this character and color will attract the mites as they leave the birds in the day time and crawl along the perch 1, the mites entering the trap 5 and becoming entangled in the cotton 11 and hence unable to escape.

In order that the trap 5 may contact with the ends of perches of varying lengths and diameters, as also, those that are notched at the ends to varying depths, and in order that the attracting and entangling element 11 may not be withdrawn through the hole 10, we provide a special reticulated element preferably in the form of a resilient screen guard 12 having a central portion or perch-end contact portion 13, as plainly shown in Figures 1, 3 and 4. This guard 12 preferably is comprised of mesh material, as shown in Figure 4, and is placed interiorly adjacent the hole 10 and within the trap body 5 and between the hole 10 and the attracting and entangling element 11, which is resilient and bears against the screen, the screen normally projecting through and somewhat exteriorly of the hole 10. Thus the length of the perch 1 and the diameter of the same can be accommodated by the mesh material 12, as plainly shown in Figure 1, the resilient attracting and entangling element 11 accommodating the necessary movements of the guard 12.

The portion 13 of the guard 12 forms only a perch-end contacting element but does not serve to support the trap 5. For this latter purpose we have formed spring lug portions 14 in the front annular flange 9 of the body 5, two of these lugs 14 being formed, oppositely disposed upon both sides of the hole 10, the material of the flange 9 being cut in opposite directions to form these lugs so that entrances 15 for a cage wire 2 into the space between the lugs 14 and the flange body 9 are formed upon opposite ends of the lugs 14, as plainly shown in Figure 3. Therefore, if the screen-guard 12 is alined with the perch 1 and the trap body 5 then turned to the right, the spring lugs 14 will be clamped to the wire 2 of the cage, as plainly shown in Figure 1.

The attracting and entangling cotton 11 should be removed and destroyed and fresh cotton placed in the trap at intervals of about one week. It is evident that, if desired, one of the improved traps could be secured to the bird-cage at each end of the perch 1.

The improved trap is economically manufactured, very efficient in use, and easily and securely attached to cages having varying sizes of perches and wires.

What we claim is:

1. An insect trap comprising a perforated housing; resilient means therein normally projecting through the perforation thereof for holding insect-entangling means; and means formed on said housing for securing the trap in mounted position.

2. An insect trap comprising an open-ended drum; a removable cover for one end of said drum, the opposite open end serving as an entrance; an alluring and entangling element in said drum opposite said entrance; a perforated guard between said entrance and said element to prevent the latter being drawn through the entrance; and means formed on said drum for securing the trap in mounted position.

3. An insect trap comprising an open-ended drum; a removable cover for one end of said drum, the opposite open end serving as an entrance; an alluring and entangling element in said drum opposite said entrance; a perforated guard between said entrance and said element to prevent the latter being drawn through the entrance, said guard being movable inwardly to accommodate the end of a bird-cage perch or the like; and means formed on said drum for securing the trap in mounted position.

4. An insect trap for bird cages comprising a housing perforated at one end; compressible insect-entangling means contained within the housing; a resilient guard intermediate the perforated end of the housing and the insect-entangling means and having a centralizing contact portion to accommodate the end of a bird-cage perch, the insect-entangling means serving to press the guard toward the perforated end of the housing.

LESLIE G. HENNING.
JOHN REIN.